United States Patent
Prasad et al.

(10) Patent No.: US 8,166,167 B2
(45) Date of Patent: Apr. 24, 2012

(54) SYSTEM AND METHOD FOR PROVIDING CUSTOMIZED RENDERING OF CONTENT

(75) Inventors: Srikiran Prasad, Cupertino, CA (US); Robert Haitani, Menlo Park, CA (US); Nancy Gayed, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1202 days.

(21) Appl. No.: 11/465,786

(22) Filed: Aug. 18, 2006

(65) Prior Publication Data

US 2008/0046595 A1    Feb. 21, 2008

(51) Int. Cl.
*G06F 15/173* (2006.01)

(52) U.S. Cl. ......... 709/226; 709/217; 709/218; 709/219

(58) Field of Classification Search .................. 709/217, 709/218, 219, 226
See application file for complete search history.

(56) References Cited

U.S. PATENT DOCUMENTS

| | | | |
|---|---|---|---|
| 7,672,778 B1 * | 3/2010 | Elliott | 701/209 |
| 2006/0069503 A1 * | 3/2006 | Suomela et al. | 701/211 |
| 2008/0309550 A1 * | 12/2008 | Sairo et al. | 342/357.1 |

* cited by examiner

*Primary Examiner* — Liangche A Wang

(57) ABSTRACT

Content data is programmatically received or retrieved programmatically from one or more network locations. The content data may be provided in part by a source entity, such as a carrier of a cellular network. A content is rendered from the content data on one or more user-interactive display objects. An ability of a user to interact with the one or more user-interactive display objects is configured based on customization data associated with the entity.

40 Claims, 6 Drawing Sheets

SYSTEM AND METHOD FOR PROVIDING CUSTOMIZED RENDERING OF CONTENT

TECHNICAL FIELD

The disclosed embodiments relate generally to the field of content delivery, and more particularly, to a method and system for customizing the rendering of content on devices.

BACKGROUND

Communication devices have evolved to include numerous types of communication capabilities and functionality. For example, handheld devices exist that operate as cellular phones, messaging terminals, Internet devices, while including personal information management (PIM) software and photo-management applications. Consumer-friendly computing technology as also been incorporated into numerous mobile mediums, such as watches and automobiles.

With diversification of such devices, the advancement of data transfer between devices has also expanded. In particular, cellular networks are transferring data at greater and greater speeds, enabling rich content to be transferred to wireless devices. Text content, image, video and audio can now be transferred cellular devices using a broadband wireless network. The now also use greater processing resources and memory to better handle and render delivered content from the cellular networks.

DETAILED DESCRIPTION

Figure 1:
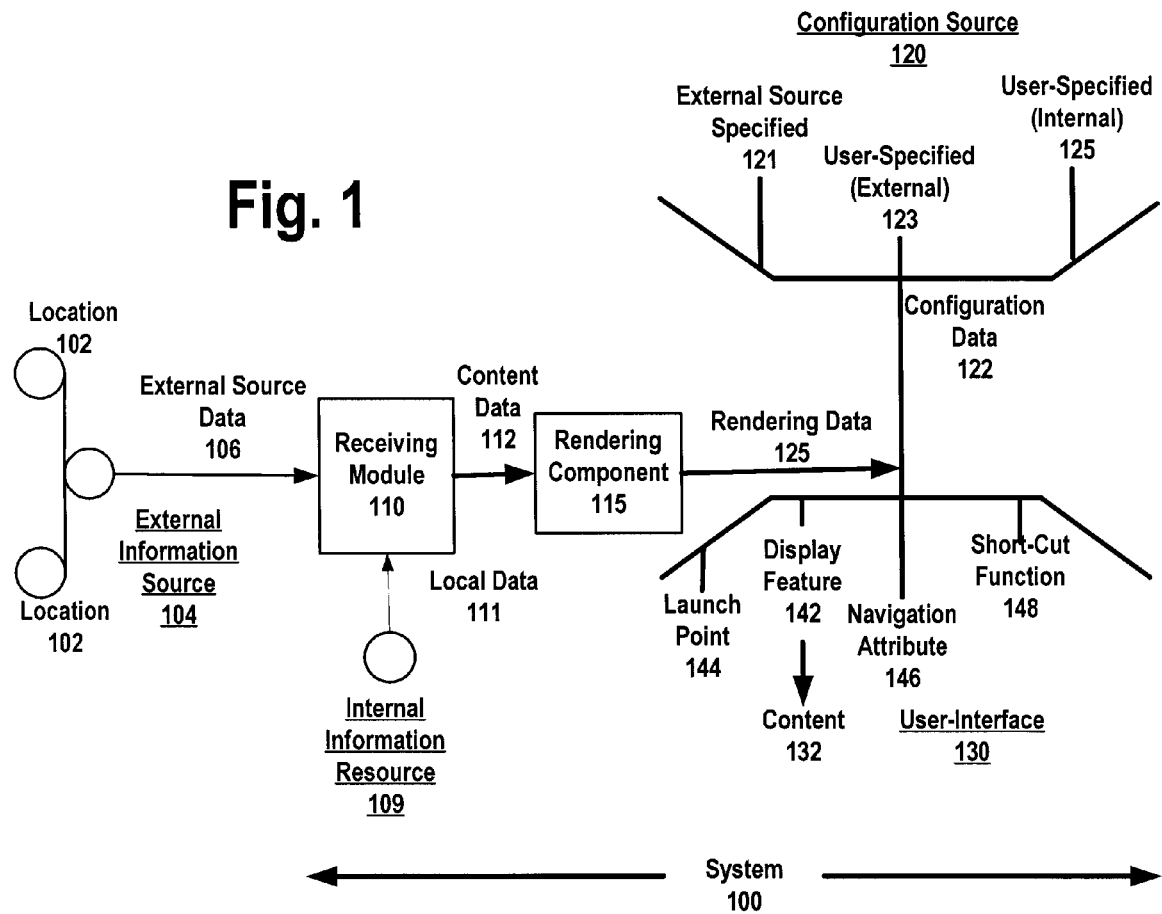
FIG. 1 is a block diagram illustrating a method for customizing a user-interface feature with content, according to an embodiment of the invention.

Embodiments described herein provide a system, method and technique for providing customizations to user-interface features that render dynamic content from various sources, including external sources. Under an embodiment, the customizations may be provided at least in part from a third-party that is, or is associated with, an external source of content that is delivered to a computing device. The content may be rendered on the device through use of user-interface features. Customization data provided from an external source may configure the rendering of the content with the user-interface features, including functionality and operability provided with the user-interface features.

One or more embodiments may be implemented on a wireless computing device capable of receiving communications on a cellular medium. Customization data may include data specified by a carrier to configure the rendering of the content, as well as the user-interface features employed with the rendering of the content. The carrier may also serve as a source of the content, either by hosting network services that deliver content to the device, or by providing the infrastructure by which the device accesses content from remote sources.

In an embodiment, a framework is provided by which customizeable user-interface features may be generated and configured with additional customization data provided from a carrier or other source that supplies content to the user-interface features. In this way, the user-interface features may generate dynamic content, using content data that is located at various external or even internal locations. The content and/or user-interface features may be customized with the customization data. In one embodiment, the framework is in the form of a software architecture that enables the use of a plug-in to generate display objects and other user-interface features. The plug-ins may execute to automatically receive or retrieve content data from specified external sources, on a repeated or continuous basis. In this way, the user-interface features may render content dynamically from the different sources (which may include carrier information services). The plug-ins may also access customization data that influences or configures the rendering of the dynamic content and/or the operability of the various display objects.

Under an embodiment, a source provides or otherwise enables the transport of content data to a computing device from one or more network locations. The source that provides or enables the transport of the content data may correspond to an entity, such as a carrier of a cellular network. =From the content data, the computing device renders content and integrated the rendering of the content with one or more user-interactive display objects. An ability of a user to interact with the one or more user-interactive display objects is configured based on customization data provided by or associated with the source entity (e.g. the carrier of the computing device, or the web site from which content was retrieved).

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Numerous types of computing devices may be used with embodiments described herein. As mentioned, one type of computer telephony device for use with an embodiment is a wireless, mobile computing device, sometimes called the "smart phone". Such devices are generally small enough to fit in one hand, and provide cellular telephony features in combination with other applications, such as contact applications for managing contact records, calendar applications for managing and scheduling events, task applications for keeping lists, and camera applications for capturing images. Another type of computer device contemplated with an embodiment is a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System (PSTN)) and provide software interfaces and applications.

System Overview

FIG. 1 is a block diagram illustrating a method for customizing a user-interface feature that renders content with customization data provided by or associated with an external source of the content, according to an embodiment of the invention. In FIG. 1, a system 100 for providing content includes a receiving module 110, a content rendering component 115, a customization resource 120, and a user-interface 130. The user-interface 130 may be customized, either in how it renders content, or in functionality or operability of user-interface features and attributes provided when the content is rendered. The content rendered with the user-interface 130 may originate from an external information source 104, or an internal or local information source 109, depending on the implementation.

An embodiment such as shown by FIG. 1 may extend to different platforms, devices, user-interface types, and content (e.g. text, image, video and media). Furthermore, the external information source 104 may correspond to, for example, a network service provider, a web site, or a television/media broadcaster. For example, in one embodiment, the external information source 104 is an information service that is provided by a carrier of a wireless network to subscribing wireless devices. As will be described, one or more embodiments provided for the external information source 104 to correspond to information that (i) is selected by an external source for delivery to the system 100, (ii) selected by a user from a library or pool of information offered by the external source, and/or (iii) is provided by the source, but has an origin with another source (e.g. an information service provides a link to a third-party web site). Accordingly, the receiving module 110 communicates and exchanges data with the external source information 104 using any one of a number of communication mediums (e.g. cellular network, satellite or cable media). In one implementation, the external information source 104 derives or receives content from other locations, such as network locations 102. The external information source 104 communicates source data 106 to the receiving module 110.

Under an embodiment, the receiving module 110 handles the incoming data and communicates content data 112 for the content rendering component 115. The content rendering component 115 supplies rendering data 125 to the user-interface 130. The rendering data 125 may correspond to content, which may be rendered in part, selectively, or completely on the user-interface 130. Alternatively, the rendering data 125 may provide additional features to the user-interface 130 or its features to convey information or data about or pertaining to the content. As will be described below, the content and the user-interface 130 nay be customized by, for example, the source of the content.

In addition to external information source 104, one or more embodiments further contemplate use of local information. The local information source 109 may include, for example, content from records and files stored on the system 100. In one embodiment, local data 111 may be communicated to the rendering component 115, and the rendering data 125 may comprise a portion generated from the local data 111.

The receiving module 110 may be implemented with hardware, software, firmware or a combination thereof. In an implementation where system 100 and the external information source 104 communicate across a wireless medium and/or network, the receiving module 110 includes a communication port on the receiving device. In one embodiment, the receiving module 110 includes a programmatic and automatic retrieval mechanism to retrieve data from the external information source 104 on a periodic or event driven basis. Alternatively, the receiving module 110 may simply receive the data in connection with the external information source 104 using a push mechanism to communicate the source data 106. Still further, under one embodiment, the receiving module 110 is distributed to enable the push mechanism from the external information source 104.

The user-interface 130 may be provided by one or more applications. In one embodiment, the user-interface includes a display feature 142 on which the content 132 is provided in connection with another feature. As described below, for example, the display feature 142 may be provided by a primary application that displays content and information independently of another application (plug-in) on which added user-interface functionality is provided. The added user-interface functionality may include, for example, one or more of the following: (i) a launch point 144 (e.g. "iconic display button"), (ii) temporal display component (e.g. see in-focus window 620 of FIG. 6B) (iii) a navigation attribute 146 (e.g. see FIG. xx), and (iv) a short-cut function 148. Numerous other types of functionality are also contemplated. For example, the user-interface 130 may include functionality for enabling input and interaction in connection with the content being rendered.

In one embodiment, the customization resource 120 may include data and/or programmatic instructions which customize the rendering data 125 and/or configure execution of the user-interface 130. The customization resource 120 may be based on one or more different kinds of data. For example, the customization resource 120 may be based on one or more of the following: (i) data specified by an external source ("external source specified data 121"), including by an entity or body that provides the external information source 104; (ii) data specified by a user through an external source ("external user-specified 123"), including through use of a service or interface provided with the external information source 104, and (iii) information specified by the user ("internal user-specified data 127"). Data collectively transferred from the customization resource 120 is referred to as customization data 122. In addition, the configuration resource may be obtained from other sources and mechanisms, such as from profile information derived from programmatically monitoring the user's activities and inputs.

In an embodiment, the customization resource 120 enables one or more of the following: (i) selection of sources (e.g. external or internal, specific location 102 etc.) from which content 132 is generated, (ii) configuration or selection of how the content 132 is rendered from the content data 112, (iii) the type and extent of interaction that the user can have with the rendered content 132 via the user-interface 130; and (iv) the functionality associated with the rendered content 132, via user-interface 130.

For example, the user-interface 130 may include the launch feature 144. In one embodiment, the launch feature 144 corresponds to an icon or object that enables the user to enter selection input. When selection input is entered, the system 100 accesses another source to display content, on for example, the display feature 142, or another display component. The other source of content may correspond to a network or external location, cached data, or an internally stored file. In this context, the configuration data 122 may specify the particular source of the additional content, or even whether the launch point feature 144 is to be enabled for a particular content 132.

Figures 6A, 6B:
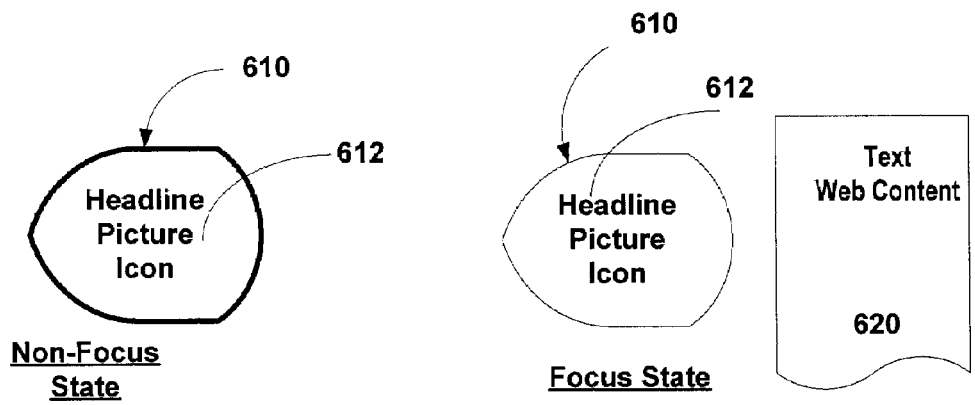
FIG. 6A and FIG. 6B illustrate different states of a display object, according to an embodiment of the invention.

With regard to navigation attribute 146, one embodiment provides for use navigation functionality that enables the use to skip from one feature or content 132 to another feature or content 132. For example, as described with an embodiment of FIG. 6A, the user-interface 130 may include one or more display objects. In one embodiment, navigation attribute 146 may enable a hover mode in response to a single navigation input. The configuration data 122 may specify whether the navigation attribute is enabled (e.g. hover mode in response to select), and/or how the navigation attribute 146 can be implemented. For example, the configuration data 122 may determine what and how much content to provide in an in-focus window (FIG. 6B).

The short-cut function 138 of the user-interface 130 refers to a selectable object, that when selected, causes the system 100 to perform one or more operations. A traditional short cut operation 148 may correspond to a speed dial on a mobile computing device, or a button to select an application to open. In one embodiment, for example, configuration data 122 may specify what short-cut functions 138 are to be visually altered with the rendering data 125. Furthermore, the configuration data 122 may specify events that result in rendering data 125 being used to alter the appearance or functionality of the short-cut events. For example, in the case of a speed dial, a missed call from a person associated with a speed dial may result in the speed dial blinking or being visually altered. In this example, the selection of the speed dial that is to be affected in this manner may be based on the configuration data 122.

According to one embodiment, the customization data 122 is particular to the external information source 104, or to an entity associated with the external information source 104. For example, as described below, in the context of wireless mobile computing devices, the external information source 104 may correspond to a wireless carrier, and the customization data 122 may implement configurations designated by a wireless carrier of the mobile computing device. In one embodiment, customization data 122 is pre-existing on the device, and is designed to implement configurations and preferences of the source entity. For example, the receiving module 110 and the customization resource 120 may form part of the same application or set of applications/instructions.

Figure 3:
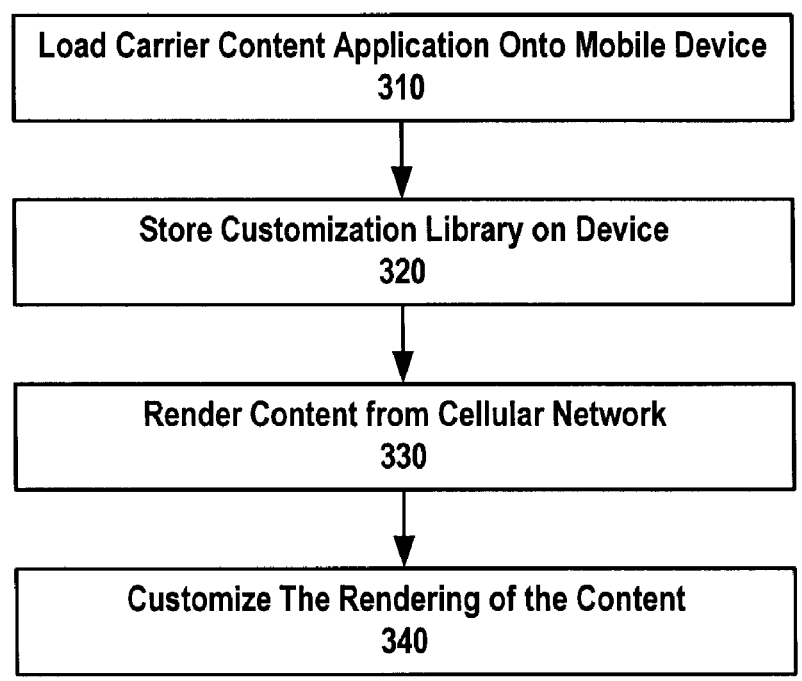
FIG. 3 illustrates a method for implementing a framework by which a mobile computing is enabled to provide carrier customizations and user-interface features on which content is rendered, according to an embodiment.

As described with, for example, FIG. 3, a framework may enable an application to provide at least some of the user-interface features of the user-interface 130, as well as pre-loading data that is specified by the third-party in the customization resource 120. The application(s) may also implement the receiving module 110, which is designed to receive the content data 112 from the specific source. Alternatively, the receiving module 110 may be entirely pre-existing, and the framework enables third-parties to create applications that utilize the receiving module 110. As also described with embodiments provided below, the applications that are enabled for use under such a framework may be in the form of "plug-ins" which provide various user-interface features in combination with the view of one or more other primary applications.

In another embodiment, the external information source 104 is determined responsively (e.g. on-the-fly) by the plug-in or by the customization resource 120. The customization resource 120 may also select the customization data 122 based on the source identification. For example, the receiving module 110 may programmatically identify the external information source 104 from the source data 106, using, for example, a domain of the uniform resource locator, or a channel on which the source data 106 is communicated.

As mentioned, an embodiment such as shown by FIG. 1 may be implemented on any one of numerous devices, systems, platforms or applications. For example, other embodiments (as described elsewhere) may be implemented on a wireless computing device, and serve to customize content that is communicated over a wireless medium or network. As another example, an embodiment may be implemented on a personal computer that receives content from an Internet connection. Some of the content receives may be customized to reflect, for example, an Internet Service Provider or alternatively a domain of the network from which the content originated. Still further, another implementation may be in a digital video recorder, or set top box, which can detect a source, or entity associated with a source, or television or video programming. The manner in which the programming is rendered to the user, or which interaction with the programming (e.g. through remote control) is enabled, may be customized based on a source or origin of the programming.

Methodology

Figure 2:
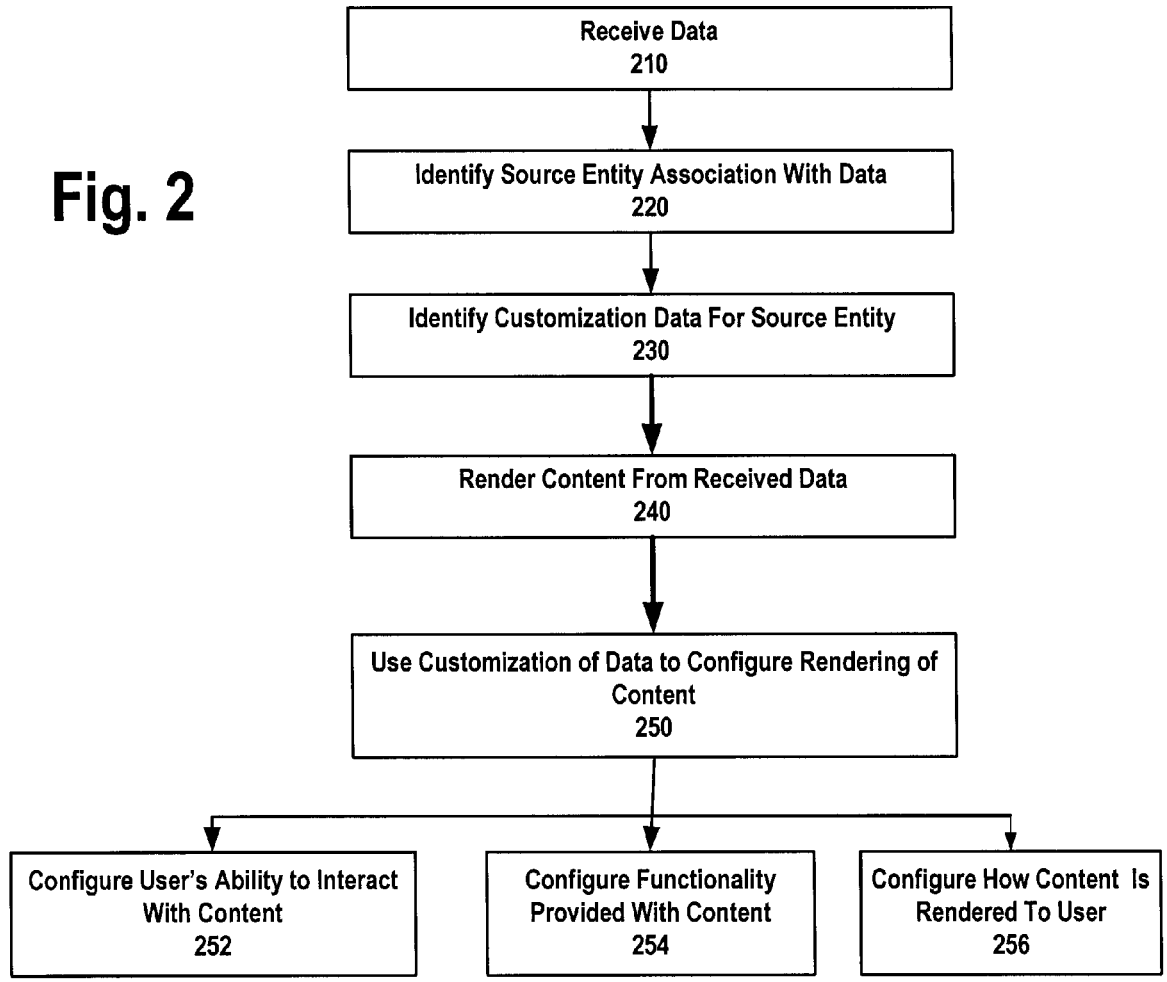
FIG. 2 illustrates a method for customizing a user-interface feature with content, according to an embodiment of the invention.

FIG. 2 illustrates a method for customizing a user-interface feature with content, according to an embodiment of the invention. A method such as described with FIG. 2 may be implemented using an embodiment such as described with FIG. 1. Accordingly, reference to elements of FIG. 1 are provided for purpose of illustrating suitable components for implementing a step, sub-step or operation of a step being described.

Step 210 provides that data for rendering content is received. In an embodiment, dynamic data is received to render content that is also dynamic. Content rendered from dynamic data changes over time, whether as a result of the nature of the content (e.g. video) or through the fact that the content may be repeatedly and/or periodically updated. Thus, an act of retrieving data, or alternatively receiving data that is pushed, may be performed repeatedly over a given duration so that the data is dynamic through the use of repeated updates. On a wireless computing device, for example, data for rendering the content may be received from a carrier. On a set top box or digital video recorder (DVR), the data may be received from a television broadcast or cable provider of television content.

Step 220 provides an optional (or implementation specific) step by which a source of the received data is identified. In one implementation, a source (or other third-party associated with the source) is determined responsively to receiving the data. For example, the source may be identified from the location from which the data is transmitted, or located (e.g.

web domain or cable channel). In another implementation, this step may be omitted because the source may be identified from knowledge or prior designation (i.e. "pre-identification"). For example, an application may execute on the computing device to programmatically retrieve data from a set location and source, and this application may be configured to identify a particular entity with respect to content provided from the data.

In step 230, customization data is identified for the source. If the source is determined on-the-fly, the customization data may be selected based on the determination of the source entity. Alternatively, the customization data may be selected for a particular nature or type of content, while at the same time being particular to a specific source entity. Alternatively, in one basic implementation, the same set of customization data or configurations may be implemented on each rendering of content from content data. Thus, in the latter case, the content data may be dynamic, but the customization data may not.

In one embodiment, step 240 provides that content rendered from data received in step 210 is displayed, or alternatively made available for display, on a user-interface feature of the system. Various kinds of user-interface features are contemplated for use with one or more embodiments. In one embodiment, the user-interface renders the content while enabling the user to interact with the rendering of the content. For example, the user may enter input that affects how the content is rendered. Examples of user-interface features for use with one or more embodiments include: (i) a graphic user-interface comprising a window or box that is provided iconic and/or menu controls, (ii) a display area and a set of mechanical actuation mechanisms or control device that enable control or interaction with content provided in the display area (e.g. remote control or set of buttons); or (iii) one or more selectable objects on a graphic user-interface that are individually selectable to view content, or which can render at least partial content in a non-focus state. In one plug-in implementation such as described with an embodiment of FIG. 4, all of these features may be implemented on a single view, which may form part of the user-face of another application.

In step 250, the user-interface, or the manner in which the user-interface is operated, is configured with customization data. In an embodiment, the customization data is associated with the source, or a third-party associated with the source. However, as described in an embodiment of FIG. 1, some or all of the customization data may be derived from the user, directly or indirectly (e.g. user may interface and enter data through the source).

In one embodiment, the customization, at least in combination with the data rendered, is dynamic. The customization may be placed in effect each time new content is rendered from received data, or each time the received data updates existing content. The customization may take several forms, such as described with one or more of the sub-steps 252, 254 and 256. The effect of using the customization data is that the manner in which the content is rendered, or can be interacted with, is altered from what would be possible without the customizations.

In the sub-step 252, the user's ability to interact with the content is altered by the customization data. For example, with reference to the launch point 144 implementation, the ability of the user to select the ultimate source that is provided when the launch point is selected may be determined from the customization data. As another example, the user may be programmatically precluded from removing a particular content rendering, or feature on which content is provided. As the content may be temporal (e.g. video) the user's ability to move forward, backward or pause may be enhanced or negatively affected. Thus, in one implementation, the ability for the user to skip past certain content may be disabled by the customization data. For example, a commercial or banner ad selected by the source entity may require rendering.

In a sub-step 254, functionality provided with the user-interface when rendering a specific content may be customized, or otherwise configured with the customization data. For example, a feature of the user-interface may be selectable to enable the user to manually, or programmatically perform more actions. For example, the user may be able to select a display area to view content, and then select from the content or the display feature to cause information about a user's account to be accessed. Some links in displayed content may be deactivated by the customization data, while others promoted. Whether a display object (as described with FIG. 6A and FIG. 6B) may be used as a launch feature 144, and whether that launch feature 144 may be used to access local, cached or external content may be affected or determined by the customization data.

In another embodiment, sub-step 256 provides that the manner in which the content is rendered to the user may be customized. For example, if multiple content items are displayed reflecting content originating from different locations, the arrangement or sequencing of how the content items are presented may reflect a priority designated by the customization data. In another implementation, the customization data may actually affect what is rendered. Still further, navigation attributes 146 may be determined or affected. For example, whether "hover text" is enabled, and how much content is provided with the hover text may be determined by the customization data.

Customization Plug-In for Mobile Computing Devices

One or more embodiments provide for the use of mobile devices that can customize the rendering of content, and user-interface features associated with rendering the content, using customization data such as described with FIG. 1 and FIG. 2. In one embodiment, a framework is provided by which a device application may retrieve/receive dynamic content, and render the content through or with user-interface features. The framework may include a device application and one or more external sources of information. Additional sources of customization data, whether received from the user or a third party, may also be included in the framework.

In one embodiment, a mobile computing device (such as a cellular telephony/messaging device) retrieves content data, and customizes dynamic rendering of the content. The customization may be based on data that is provided or under the control of the source of the content data. In an embodiment, the source of the data is a carrier information service, and the customization data may be specified by the carrier. A user may also specify customization data, either through use of the carrier information service or directly on the device. The carrier information service may include a network of resources that link a network domain of the carrier, or sites associated with the carrier, to the mobile device.

FIG. 3 illustrates a method for implementing a framework by which a mobile computing is enabled to provide carrier customizations and user-interface features on which content is rendered, according to an embodiment. Examples of computing devices that can be employed with a method of FIG. 3 include cellular telephony and messaging devices (e.g. smart phones), including multi-functional devices with image and video capturing functionality.

In a step 310, a carrier content application is loaded onto a mobile computing device. The application may be loaded as part of an operating system, or by the carrier after the device has been manufactured and the ROM "sealed". Alternatively, the application may be loaded onto the device at any time, such as after sale, or by a vendor at a time of sale. Under an embodiment, the carrier content application is not a browser, but rather a component that generates content from a wireless stream of data. The content may be in the form of text, image or media.

In one embodiment, the carrier content application is linked to a carrier information service. The carrier content application may execute background processes to continuously retrieve or receive content data from the carrier information service. The particular content received may be selected by the carrier or the user. The carrier content application may operate automatically to retrieve or receive the data. For example, the carrier content application may continuously retrieve select content data, cache the data, and use the cached data to update the content that is rendered on the computing device. This favors in comparison to more traditional approaches for rendering network content on a mobile computing device, such as through use of manually operated browsers that require the establishment of a communication session or connection before content can be retrieved or rendered from a network site.

Figure 4:
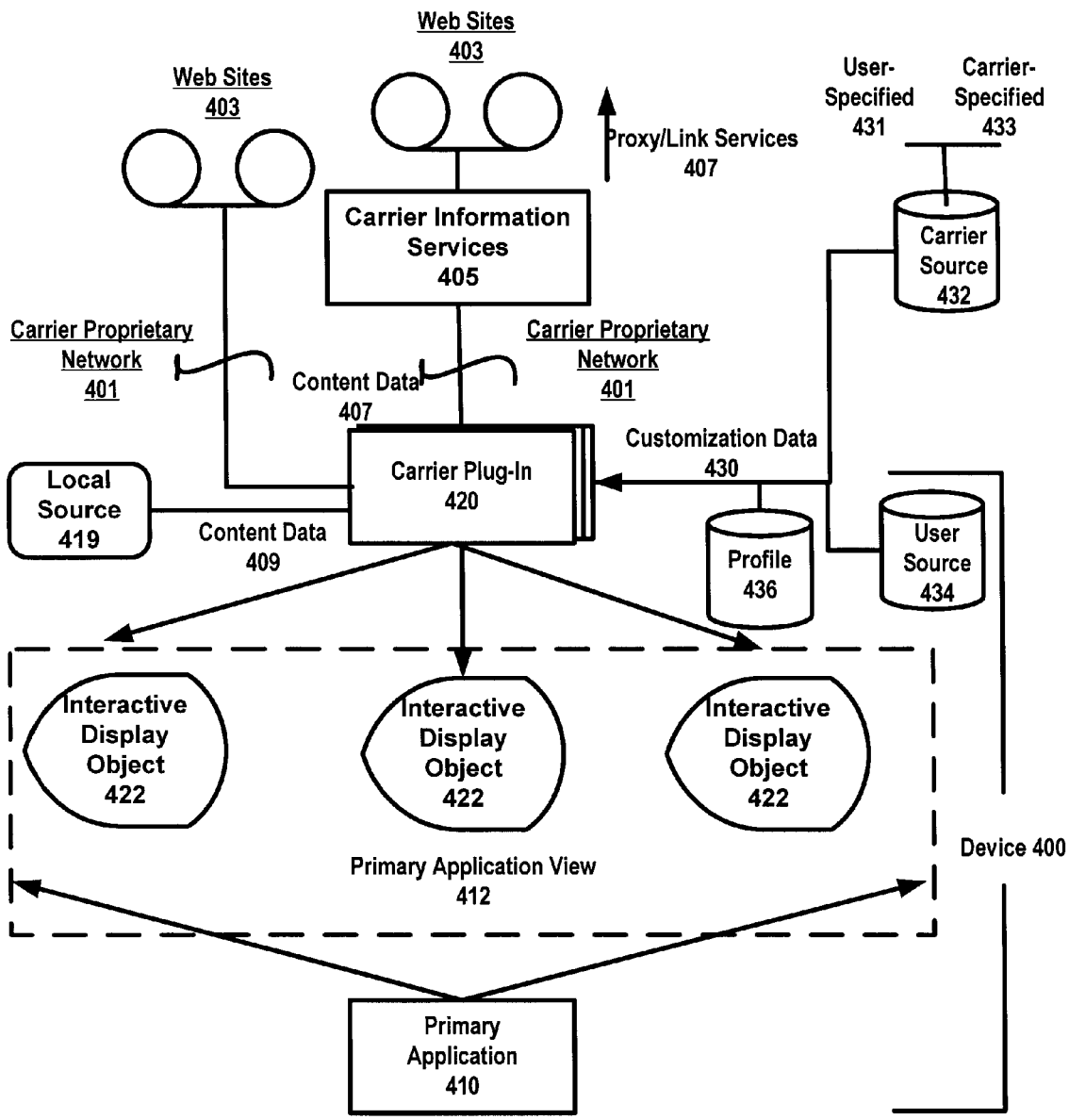
FIG. 4 illustrates an architecture for enabling customization of content rendering on a computing device, according to one or more embodiments of the invention.

In one embodiment, the carrier content application is in the form of a plug-in application (see FIG. 4). As a plug-in application, the application is relatively small (as compared to other applications), and executes as part of or concurrently with one or more other applications. In an embodiment, the carrier content application executes to generate one or more user-interface features on which content from the carrier information service may be provided or rendered. In one embodiment, the user-interface features are in the form of display objects, which may or may not be interactive with the user. For example, as described elsewhere, the display objects may be selectable to cause the device to perform actions (e.g. network retrieval of more content) or to cause the display of more content in an associated window.

In a step 320, a customization library of data and/or set of instructions is also stored locally on the device, for use by the carrier customization application. The customization data may be created on the device at the time the carrier content application is loaded. Alternatively, the carrier customization data is transmitted to the device (e.g. wirelessly, through a cellular network). In one implementation, the customization data is also updated from time to time. For example, a background process operating on the wireless device may receive customization update data for the library. As mentioned with one or more embodiments, the customization library may customize how content is rendered, in a manner that is specific or particular to a preference or designation of the carrier or of the user.

Step 330 provides that the carrier content application renders content from data that the wireless computing device receives from over the cellular network. The content rendered may be dynamic. The carrier content application and/or the customization data may identify the origin of the data (e.g. file or network location). The identification of what data to receive, and derive content from, may be made from, for example, any one of the following: user-input or selection, user-preference, user-profile, or carrier designation. For example, the carrier may have a designated set of web sites that the carrier content application can receive data from. The specific web sites that are used for delivering content to the wireless device may be based on one or more of the factors listed above.

Content rendered from data received by the wireless device may be provided with or on a user-interface generated (at least in-part) by the carrier content application. Step 340 provides that the rendering of the content is customized, configured or otherwise altered by customization data of the carrier and/or the user. Under one embodiment, a result achieved is the presentation of the content from the data with characteristics or functionality that conforms to the customization data. In one embodiment, the characteristics or functionality are specified by or specific to the carrier.

According to one embodiment, the carrier content application provides display objects on one or more displays of the wireless device. For example, display objects may be provided over a default view (e.g. the Home View in a WINDOWS MOBILE operating system, as manufactured by MICROSOFT CORP.) of the wireless device. Each display object may, in at least one setting or mode, occupy a limited area of the overall display. For example, the display objects may be in the form of large icons. To this end, the display objects may include user-interactive features. The features may enable the display objects to have one or more states of selection, or include other mechanisms for enabling the user to interact and enter input. The customization data may enable the carrier content application to perform, for example, any one of the following: (i) determine what portion of a content available from a particular source is to be displayed in a given display object, (ii) select the content, or its origin/source, that is to be provided from the display objects individually; (e.g. set priority or sequence of display objects carrying content), (iii) determine what is to be displayed in a given display object, when the given display object is in a non-selected, partially-selected (e.g. "in focus") or fully selected state; and (iv) determine what functionality or level of interaction (e.g. what menu features or control operations are permitted) is permitted with a given display object that is rendering content.

FIG. 4 illustrates an architecture for enabling customization of content rendering on a computing device, according to one or more embodiments of the invention. In an embodiment of FIG. 4, a wireless computing device 400 includes a plurality of applications, including a primary application 410. The primary application 410 is operable on the computing device 400 to provide an application view 412. The application view 412 includes a user-interface, having a display area where information and content provided by the primary application is displayed. The application view 412 may also display information and content from execution of other plug-ins, or applications other than the primary application.

In one implementation, the primary application 410 is an application that provides a default or home view. The home view is, in many device, the first view the user sees when device 400 is made operational. As an addition or alternative, the application view 412 (when it is the home view) provides a summary of information and events tracked or maintained by the device 400. For example, application view 412 may display user-interface features to multiple applications (e.g. contact lookup), a list of calendar appointments or tasks, and recent or upcoming events.

According to an embodiment, one or more plug-in applications 420 may operate with the application 410 to provide a plurality of additional content features on or with view 412. The content features may be provided in the way of one or more display objects 422. The one or more display objects 422 supplement, overlay, or are otherwise integrated with the view 412. Multiple plug-ins 420 may each provide one display object 422, or one plug-in may provide multiple display objects 422. Furthermore, plug-ins 420 and display object(s) 422 may be operated in association with more than one primary application 410. According to one or more embodiments, the display objects 422 are user-interface features that enable or provide one or more of the following: (i) display content or rendering data from a content source, (ii) are selectable to display such content or rendered data, and/or (iii) are interactive in that they are selectable and/or have other interactive functionality associated with them.

In an embodiment, each plug-in 420 is capable of rendering content provided from the carrier (or other external source) through one or more of the display objects 422, including web content, but the plug-in is not a browser. Rather, the plug-in 420 may include a programmatic component to retrieve or receive content from the carrier or other network resource. Under one embodiment, the content retrieved by the plug-in 420 is dynamic content. The sources for the content may include third-party web sites 403. Alternatively, the sources for the content may originate from the carrier information service 405. The web sites 403 may be those selected by the user, outside of the control of the carrier. The carrier information services 405 may include various kinds of content and information provided by a carrier to its customers. This information may include web based information, managed under, for example, a domain of the carrier. The information may include announcements, messages from the carrier to customers, billing information, and content selected by or for the user (e.g. sports, news and stocks). In addition, the carrier information services 405 may include a proxy service 407 (or links) to the web sites 403 of third-parties. In one implementation, the plug-in 420 may access a network location of the carrier to retrieve data on a periodic basis. The particular network location may contain content of a particular origin. For example, the network location may be within the domain of the carrier, but act as a proxy to third-party content. Alternatively, the network location may correspond to a third-party site that is specified by the carrier (e.g. through the carrier customization data 432 described below).

In one embodiment, plug-in 420 performs content retrieval, automatically and in the background. For example, the user may specify information about how the retrieval is to be conducted, then let the device perform automatic programmatic retrieval of content from the carrier information services 405 or the web sties 403. Retrieved content may be cached and dynamic. Even when the user is not connected (e.g. device out of cell range), the content rendered from the cache may be dynamic in nature. As such, the user does not need to "open" the plug-in, or specify links or web addresses to cause the retrieval of content.

In another implementation, the plug-ins 420 may operate under a push model, where a programmatic component on the carrier pushes streams of data to the device 410. The particular source of such data may be selected by the carrier and/or user. In one embodiment, for example, the carrier information services 405 include a push component that delivers dynamic data to the device from the web sites 403 or from internal resources of the service. In another embodiment, the push component is loaded on a third computer (e.g. user's personal computer) and performs retrieval of dynamic content and delivery to the device 400.

In one embodiment, each of the display objects 422 display content, or information associated with an underlying content. Additionally, some or all of the display objects 422 are interactive. For example, the user can select the display objects 422 to view additional information, or perform other operations enabled by the functionality of the display objects 422. They content for each of the display objects 422 may be generated from content data 407, 409. In one embodiment, content data 407 may be transmitted to the device 410 from an external source (e.g. the carrier information service 405).

Content data 407 may be dynamic, in that it can be used to render content that changes with time, or may be continuously or repeatedly updated over short durations. In another embodiment, the content data 409 may also have one or more local sources 419, such as data maintained in files (e.g. picture files of the user), databases or other resources maintained by the user.

In an embodiment, each plug-in 420 is configured by one or more types of configuration and customization data. The different types of customization data may include carrier customization data 432, user-specified configuration data 434, and/or user profile information 436 (collectively referred to as "customization data 430"). Carrier customization data 432 may include user-specified configuration data 431 (e.g. user interfaces with the carrier information service 405 and enters preferences and other information), as well as carrier-specified configuration data 433. The carrier customization data 432 may be downloaded, transmitted or provided with the device 400. The user-specified configuration data 434 may be received by the user during different periods of device operation. The user profile information may include information about the user. This information may also include information that is programmatically determined from the user through, for example, the monitoring of user-activities and information. Each of these types of configuration data may be integrated or available to each of the one on more plug-ins 420. Collectively, the customization data 430 affects the plug-ins 420 by, for example, (i) determining what information or content is to be rendered on an individual display object 422 when that display object is in an unselected state; (ii) determining what information or content is to ultimately be viewable through use of an individual display object 422; (iii) determining how or if they user can interact with an individual display object 422; (iv) determining what functionality (e.g. what menu items) are to be associated or made available with the particular display object 422; and (v) specifying content that is to supplement or alter the overall content that would otherwise be provided by an individual display object 422 but for that customization data 430.

With regard to additional details of how the customization data 430 affects the plug-ins 420, the customization data 430 may determine, for example, how many display objects may be present, and the arrangement of the display objects 430. For example, user-specified data 434 may include what information the user has selected to receive (sports, weather, stock, headline news). The carrier customization data 432 may determine what content from the user-selection is to be made prominent, or how each of those contents are to be displayed on size. In a list of stock quotes, the carrier customization data 432 may include or list the stock of the carrier. With the news, the carrier customization data 432 may also provide news items pertaining to the carrier, the carrier's service, or other information that the carrier wants the user to know about (e.g. the launch of a new service or device).

As mentioned, customization data 430 may specify what content is ultimately available to the user through use of a display object. Size limitation or preference may limit individual display objects 422 from displaying all available content at one time. The user may need to interact with the display objects 422 to see some or all of the dynamic content associated with that display object. For example, the user may need to scroll on a given display object 422, select it to see more content, or, as described below, use in-focus viewing. Selecting the display object 422 may cause the device to open a local file, or access a web resource. As another example, the carrier data 432 may enable some display objects to access the web site 403 that is the origin of the data being rendered, while other display objects cannot be used to access such web sites 403. The customization data 430 may determine how the user can view underlying content (e.g. scroll versus in-focus), and what that underling content may be.

Another example of information that the user can receive is carrier billing information. Carrier billing information represents a type of information and content internally generated from the carrier information services 405. The carrier customization data 432 may, for example, determine when the user is prompted to pay his bill, how amounts owed are to be rendered or made available on the device (e.g. in red when past due), or how the different types of information available through the carrier's electronic billing service are displayed or made available to the user through one or more of the display objects 422.

Furthermore, display objects 422 may include functionality that is determined or configured by the customization data 430. This functionality may include features relating to enabling user-interaction with rendered content. Under one implementation, as described below, the user may select or partially select an individual display object 422 to view content provided by display object in an-in focus state. As another example, display objects 422 may be selectable to force retrieval of content from the carrier, or from a network location such as an Internet site. Other user interface features may also be made available with the display objects 422. For example, a menu and/or hypertext functionality may be provided in association with content rendered by or made available with one of the display objects 422. The specific menu items that are made active, included with the display object 422, may be specified by the customization data 430. For example, a display object providing carrier content may have a different set of menu items than a display object providing data from a local source.

More generally, the extent to which a user has ability to interact with a display object may be set the customization data 430. In one embodiment, carrier customization data 432 may determine, for example, whether they user can avoid seeing an advertisement media provided through or in association with an individual display object 422. The carrier customization data 432 may also limit, for example, the user's ability to copy, print or save content rendered through one of the display objects 422. Thus, for example, if a given display object 422 is used to display media or rich content that originates from a web site or other resource of the carrier, the carrier may specify carrier customization data 432 that causes the plug in 420 to preclude the offensive user interaction. In this way, the affects of customization data 430 may differ depending on what a given display object is displaying (e.g. local versus network content), as well as the nature or origin of the content.

Figure 5:
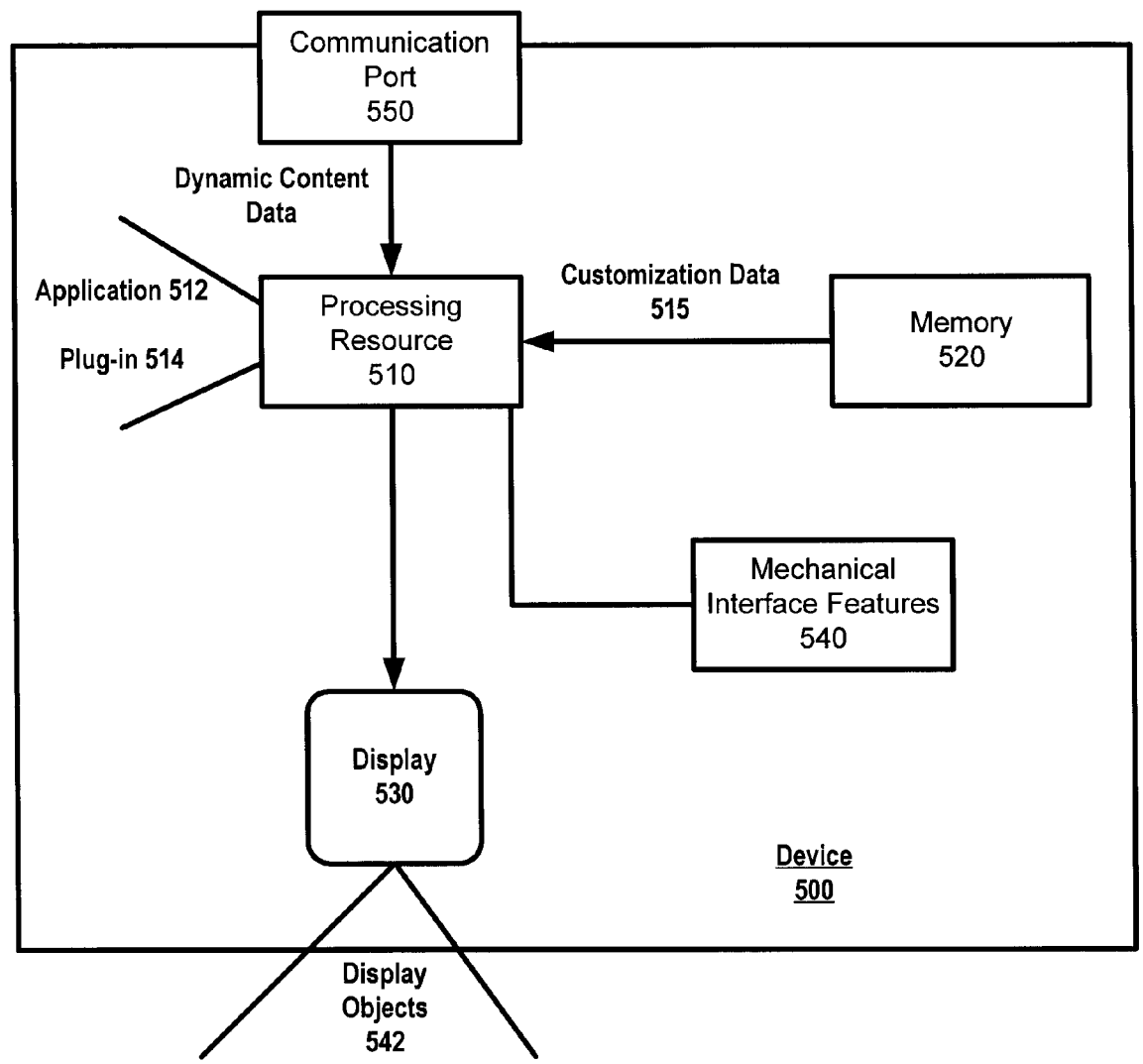
FIG. 5 is a simplified hardware illustration of a wireless device for implementing an architecture such as described with FIG. 4, under an embodiment of the invention.

FIG. 5 is a simplified hardware illustration of a wireless device for implementing an architecture such as described with FIG. 4, under an embodiment of the invention. In FIG. 5, a device 500 includes a processing resource 510 (e.g. one or more processors), one or more memory 520 for storing applications and data used by the applications (e.g. Flash memory or RAM), a display 530, a set of mechanical interface features 540 (e.g. keyboard, 5-way navigation component), and a wireless communication port 550. In one embodiment, the wireless communication port 550 is configured to receive cellular data communications, although other embodiments contemplate use of other wireless mediums, including Wireless Fidelity 802.11 (b) or (g) ("WiFi") or Bluetooth.

As shown by FIG. 5, the processing resource 510 may execute to retrieve instructions for one or more application 512 and plug-ins 514 such as described in an embodiment of FIG. 4. The memory resources 520 may store customization data 515, which as described with an embodiment of FIG. 4, may include carrier-specified customizations. In a standard mode of operation, the device 500 may use the communication port 550 to send and receive voice and/or data communications, including email and text messages. The communication port 550 may also be used for web browsing. Under an embodiment, the plug-ins 514 may implement, or cause the implementation, of one or more background processes that cause the device 500 to request from the carrier content specified by the plug-in 514. In another implementation, the plug-in 514 causes the device to access one or more network locations that are in the carrier's domain, or made available by the carrier's network resources (e.g. by proxy).

As described with an embodiment of FIG. 4, execution of plug-in 514 may generate one or more display objects 542 on the display 540. A certain level of interaction may be possible with the one or more display objects 542. In one implementation, the display 540 is touch-sensitive, and the user may use screen taps to select or partially select one of the display objects 542. Alternatively the user may use one of the mechanical features 540, such as a 5-way navigation mechanism or scroll wheel to navigate and/or select/partially select a given display object 542. According to one or more embodiments, the ability or extent by which the interaction is available in connection with the rendering of content by the display objects 542 is determined by the customization data 515. As mentioned, the customization data 515 may be integrated with the plug-in, provided separately and/or routinely updated through data communicated via the communication port 550.

Plug-In User-Interface

According to one or more embodiments, display objects (such as described above) form part of an overall user-interface that enables viewing of content provided with display objects. Additionally, navigation between display objects and other features are provided on a single view. For example, the application view of a primary application may be used to display multiple display objects, and navigation amongst display objects may be made possible.

FIG. 6A and FIG. 6B illustrate different states of a display object, according to an embodiment of the invention. A display object 610 may correspond to any of the display objects described with other embodiments (e.g. display object 422 of FIG. 4). In FIG. 6A, display object 610 is in a non-focus state. In the non-focus state, the display object 610 may have object content 612. Object content 612 may correspond to art (e.g. image) or text that either conveys or indicates information about an underlying content carried by that display object 610. The object content 612 (or rendering data) may correspond to an iconic art that indicates the nature of the underlying content (e.g. an icon indicating news item or weather or billing information), a picture that is a thumb nail of the underlying content, or a headline or summary of the underlying content. The nature of the object content 612 may also carry other information. For example, urgency, how update the underlying content is, and whether the underlying content has been viewed or not may all be represented graphically on the object content via coloring, shading or other visual effects.

FIG. 6B illustrates the display object 610 in an in-focus display state, under an embodiment. The in-focus display state corresponds to a state where the display object is selected, and triggered to display a window 620. The window may be a dynamic and/or temporally generated window that is positioned adjacent or near the display object 610.

Different triggers may be implemented to create the in-focus window 620. In one embodiment, a trigger corresponds to the display object being selected, or partially selected, for a designated duration of time. For example, the user may enter navigation input, and possibly selection input, to highlight (a visual indication of selection) one display object 620 from other display objects or user-interface features on a view. If within a given time period (e.g. one second), the user enters navigation input to move away from the display object, or performs some other operation, the window 620 is not displayed. If, however, no navigation or other input is received in the duration, then the window is displayed 620. The window may be displayed for an interval of time, or it may be terminated after some other event (e.g. the user navigates to another feature).

In one implementation, the in-focus window 620 may offer a summary or preview of an underlying content. The content may be based on content data that a plug-in (e.g. plug-in 420 of FIG. 4) retrieves from a carrier information service, web site, or even from a local source. The content may be dynamic or static, and the format of the content may be text based, image or media. Furthermore, as described with one or more embodiments, the rendering of the content may be customized by customization data (customization data 430). Thus, the functionality, operation, characteristics, and attributes of individual display objects, whether considered individually or as a whole, may be configured or customized by the customization data. In addition, what content is displayed in a given display object and alterations or modifications made to the content may also be specified by the customization data.

In one embodiment, the display object 610 acts as a launch point or feature for the user to access additional content. In addition to content displayed in the window 620, the window and/or the display 610 may be selectable to trigger other programmatic operations, such as opening a web site, retrieving more content from the same file or location, enabling the user to interact with the device after viewing the content, or perform some other operation. For example, in one implementation, the user may need to perform an additional selection operation on the display object 610 or the window 620 from the in-focus state to see all of the underlying content. In another implementation, the window 620 may display all of the underlying content at once, and may also include the ability for the user to scroll within the window. Various alternatives and variations are also possible. In either implementation, the window 620 may display text content, web content, images or even video. The particular content provided may be dependent on the application and the customization data.

Figure 7:
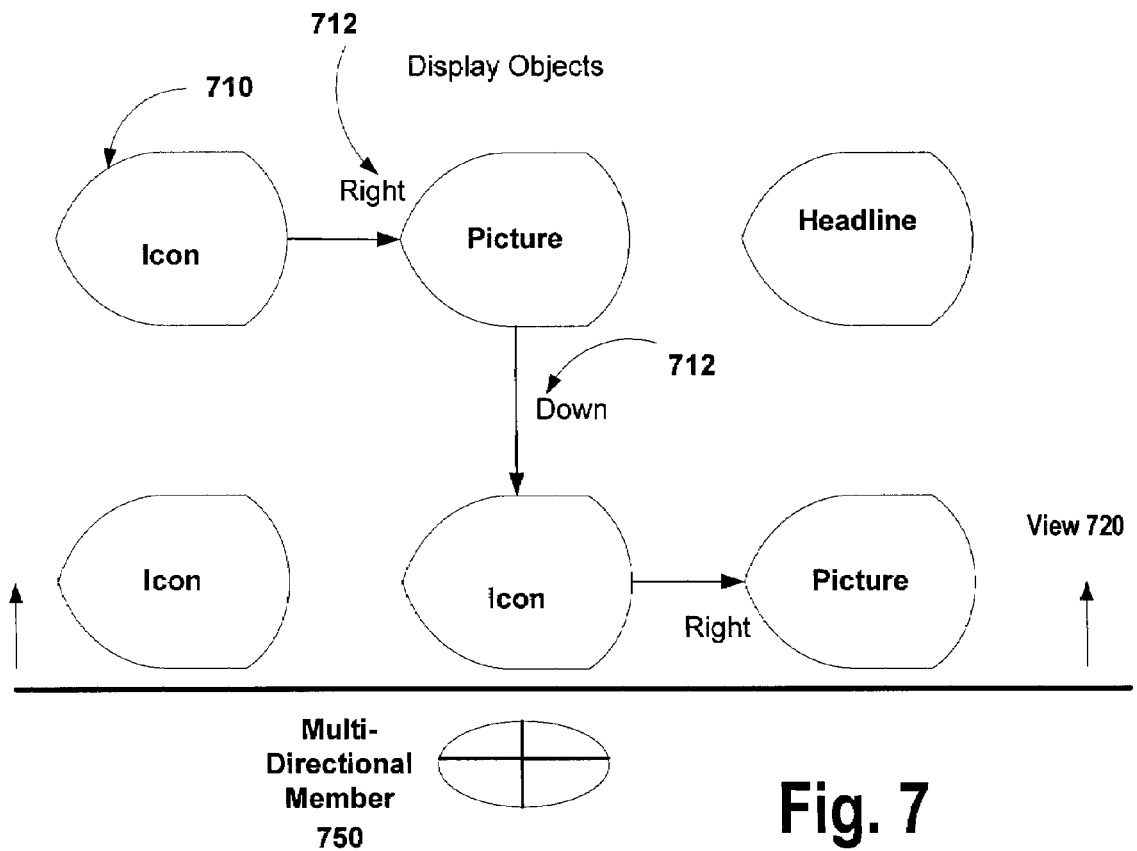
FIG. 7 illustrates a technique for enabling a user to navigate from one display object to another, under an embodiment of the invention.

FIG. 7 illustrates a technique for enabling a user to navigate from one display object to another, under an embodiment of the invention. In an embodiment, multiple display objects 710 may be in use on a given view 720 (e.g. such as generated by a primary application), either through use of one or multiple plug-ins or other carrier content applications. Under an embodiment, a device may be programmatically equipped with a navigation feature to enable a user to atomically navigate from one display object to another adjacent object. The atomic navigation means the navigation moves from one feature to a next without an intervening stop. In one embodiment, the navigation feature recognizes a navigation input 712 (e.g. left, right, up or down) and moves a selection state or state from one display object 710 to an adjacent display object 710 that is positioned or aligned in the direction of the navigation input. The navigation input 712 may be provided by a multi-directional member, or other device for use in entering directional/navigation input. For example, the multidirectional member 750 may correspond to a 5-way mechanical navigation feature for entering directional and selection input. As an atomic navigation feature, no intervening states or stops are made in the jump from one display object 710 to the next.

As mentioned, what is moved with the navigation input 712 is a selection state. The movement of a selection state corresponds to (i) one of the display objects 710 in an existing selection state being switched to an unselected state, and (ii) another of the display objects 710 adjacent to the display object with the previous selection state being switched to a selected state. The selected state for the display object may be a partially selected state. As described with an embodiment of FIG. 6A and FIG. 6B, the window 620 carrying dynamic or static content may be triggered by the combination of a selected state and the passage of a given duration of time.

In another variation, another selection input may be used to cause a display object in a selected state to display the window 620 (FIG. 6B). Still further, with respect to any of the embodiments of FIG. 6A, FIG. 6B and FIG. 7, the display objects 710 may substitute or supplement the use of window (not shown in FIG. 7) with functionality of being a launch point to other content.

In one embodiment, the customization data 430 (see FIG. 4) may configure, for example, one or more of the following: (i) the ability to navigate from one display object to another; (ii) control or affect use one display object as a launch point for accessing data or performing other operation; (iii) configure, alter or modify the window 620 (FIG. 6B) or the content provided with the window.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for providing content on a device, the method comprising:

configuring an arrangement of one or more user-interactive display objects that are each associated with a corresponding application or device functionality by enabling at least one user-interactive display object to be both (i) selectable, such that the device functionality or the application corresponding to the at least one user-interactive display object is launched in response to the at least one user-interactive display object being selected, and (ii) customized, to provide information or functionality that is based on a set of customization data, wherein configuring the arrangement includes:

programmatically receiving content data from one or more network locations, wherein the content data is associated with a carrier source;

rendering content from the content data on the at least one user-interactive display object; and configuring an ability of a user to interact with the at least one user-interactive display object of the arrangement based on customization data associated with the carrier source, including configuring an operation performed by the device in response to the user performing an action on a given one of the at least one user-interactive display object based on customization data associated with the given user-interactive display object.

2. The method of claim 1, wherein programmatically receiving content data from one or more network locations includes executing a plug-in application on a wireless device.

3. The method of claim 1, wherein programmatically receiving content data from one or more network locations includes receiving dynamic content data.

4. The method of claim 1, wherein programmatically receiving content data from one or more network locations includes receiving the content data from one or more network sites that are associated with or designated by the carrier source.

5. The method of claim 1, wherein programmatically receiving content data from one or more network locations includes receiving a wireless content data from the carrier source.

6. The method of claim 1, wherein configuring an ability of a user to interact with the at least one user-interactive display object includes determining a set of selectable input features that the user can select in association with having the content rendered.

7. The method of claim 6, wherein determining a set of selectable input features includes determining one or more menu items that can be used with the one or more user-interactive display objects rendering the content.

8. The method of claim 1, wherein configuring an ability of a user to interact with the at least one user-interactive display object includes designating what actions the user can perform in altering how the content is rendered to the user.

9. The method of claim 8, wherein designating what actions the user can perform include designating whether the user can skip, move forward, or pause the content being rendered on the at least one user-interactive display object.

10. A method for providing content, the method comprising:
configuring an arrangement of one or more display objects that are each associated with a corresponding application or device functionality by enabling at least one display object to be both (i) selectable, such that the device functionality or the application corresponding to the one or more display objects is launched in response to the at least one display object being selected, and (ii) customized, to provide information or functionality that is based on a set of customization data, wherein configuring the arrangement includes:
programmatically receiving content data from one or more network locations, wherein the content data is associated with a carrier source;
rendering content from the content data on the at least one display object; and
configuring a rendering of the content data on the at least one display object based on customization data associated with the carrier source.

11. The method of claim 10, wherein programmatically receiving content data from one or more network locations includes receiving dynamic content data.

12. The method of claim 10, wherein programmatically receiving content data from one or more network locations includes receiving dynamic content data transmitted over a cellular network, wherein the carrier source is an agent of the cellular network.

13. The method of claim 10, wherein rendering content from the content data includes rendering a content on each of the one or more display objects, wherein each of the one or more display objects displays the content from a corresponding network location.

14. The method of claim 10, wherein rendering content from the content data includes rendering a content on each of the one or more display objects concurrently, and wherein configuring a rendering of the content data includes configuring how the content is rendered on each of the one or more of the display objects.

15. The method of claim 10, wherein configuring a rendering of the content data includes configuring one or more of (i) the content that is rendered, (ii) a user-interface feature provided in connection with rendering the content, (iii) a user-interface feature on which the content is rendered, or (iv) a functionality of a user-interface feature.

16. The method of claim 10, wherein rendering content from the content data includes rendering a content on each of the one or more display objects concurrently, and wherein configuring a rendering of the content data includes configuring how a user can navigate from one display object, on which a first one of the network locations is rendered, to another display object, on which a second content from a second one of the network locations is rendered.

17. The method of claim 16, wherein configuring a rendering of the content data also includes enabling one or more of the display objects to be selectable to provide a focus field content.

18. A computing device comprising:
a memory that stores a set of customization data, wherein the set of customization data is based at least on data provided from a carrier service;
a display having a display area;
a communication port that is operable to receive content data from one or more sources; and
one or more processors operable to:
execute one or more applications that generates a plurality of display objects on the display, wherein one of a plurality of applications is launched when a corresponding one of the plurality of display objects is selected by a user;
execute the one of the plurality of applications in response to selection of the corresponding one of the plurality of display objects in order to render a content that is based on the content data from the one or more sources, wherein the content is rendered concurrently with presentation and selection of the corresponding one of the plurality of display objects; and
provide a functionality in association with the corresponding one of the plurality of display objects being presented concurrently with the rendered content.

19. The computing device of claim 18, wherein at least one of the content data received by the communication port or the rendered content is dynamic.

20. The computing device of claim 18, wherein the communication port is a wireless communication port for receiving data from a cellular network, and wherein the one or more applications are configured to cause the computing device to retrieve or receive the content data form a carrier information service.

21. The computing device of claim 18, wherein the set of customization data includes customization data specified by a user.

22. The computing device of claim 18, wherein at least one of the plurality of display objects is configured to render the content by modifying at least a portion of the content.

23. The computing device of claim 18, wherein one or more of the plurality of display objects are selectable to display a window on which the rendered content is provided at least in part.

24. The computing device of claim 18, wherein a given one of the plurality of display objects are triggerable to have an in-focus state in which a window is displayed in association with the given one of the plurality of display objects, and wherein the in-focus state is triggered by selecting the given one of the plurality of display objects for at least a designated duration.

25. The computing device of claim 24, wherein each of the plurality of display objects are triggerable to have the in-focus state, and wherein the processor includes a navigation component that enables a user to atomically navigate from one display object to another using a directional input.

26. The computing device of claim 25, wherein at least one of the plurality of display objects, the window, the rendered content, or the navigation component, is configured by the set of customization data.

27. A method for operating a mobile computing device, the method comprising:
    operating a mobile computing device to receive wireless content data transmitted over a cellular network, wherein the cellular network is under control of a wireless carrier;
    operating a carrier content application on the mobile computing device;
    maintaining a set of customization data for the wireless carrier; and
    generating, through use of the carrier content application, a user-interface feature that provides display content that is generated from the wireless content data, wherein the user-interface feature is configured by the set of customization data;
    wherein the display content is rendered concurrently with presentation of one or more display objects that are individually selectable to launch a corresponding application.

28. The method of claim 27, wherein generating the user-interactive feature includes generating the user-interface feature to provide display content that is dynamic.

29. The method of claim 27, wherein the corresponding application is not a web browser.

30. The method of claim 27, wherein operating a mobile computing device to receive wireless content data transmitted over a cellular network includes programmatically and automatically retrieving the wireless content data.

31. A mobile computing device comprising:
    a communication component for sending and receiving data transmitted over a cellular network;
    a display;
    a memory that maintains a set of customization data for a carrier of the cellular network; and
    one or more processors configured to execute an application that automatically retrieves or receives content data for generating content, wherein the content data is received by the communication component from an information service of a carrier that provides the cellular network, and wherein execution of the application includes:
        generating an active user-interface feature in an application view, wherein the application view presents a plurality of user-interface features;
        rendering the content provided by the information service in association with the active user-interface feature, wherein presenting the content includes updating the content automatically based on newly received content data;
        wherein the content is rendered concurrently with presentation of one or more display objects, and wherein one of a plurality of applications is launched when a corresponding one of the one or more display objects is selected by a user; and
        configuring the active user-interface feature using the set of customization data.

32. The mobile computing device of claim 31, wherein the application is a plug-in.

33. The mobile computing device of claim 31, wherein the one or more processors is configured to execute the one of the plurality of applications to render the content by providing at least some of the content in response to the user making the selection.

34. The mobile computing device of claim 33, wherein the at least some of the content is provided in a display window that is viewable while the active user-interface feature is in a selected or partially selected state.

35. The mobile computing device of claim 33, wherein the at least some of the content is retrieved by the mobile computing device in response to the active user-interface feature being in a selected state.

36. The mobile computing device of claim 31, wherein the one or more processors are configured to provide the active user-interface feature on a default view of the mobile computing device.

37. The mobile computing device of claim 36, wherein the default view of the mobile computing device includes a plurality of views, each of the plurality of views generated from a plug-in application that is executed by the one or more processors.

38. The mobile computing device of claim 31, wherein the set of customization data includes customization data specified by (i) a carrier of the cellular network, or (ii) a user interacting with a service of the carrier.

39. The computing device of claim 18, wherein the one or more applications are plug-ins, and wherein the plurality of display objects are provided with a view of a primary application that executes with the plug-in application.

40. The computing device of claim 23, wherein at least one of the plurality of display objects, the window, or the rendered content is configured by the set of customization data.

* * * * *